United States Patent
Tunnicliffe et al.

(10) Patent No.: US 6,272,110 B1
(45) Date of Patent: Aug. 7, 2001

(54) METHOD AND APPARATUS FOR MANAGING AT LEAST PART OF A COMMUNICATIONS NETWORK

(75) Inventors: Andrew Tunnicliffe, Herts; Gillian Barbara Kendon, Chester; Timothy John Edwards; Stephen Charles Cross, both of Herts, all of (GB)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/082,102

(22) Filed: May 20, 1998

(30) Foreign Application Priority Data

Oct. 10, 1997 (GB) .................................................. 9721698

(51) Int. Cl.⁷ ...................................................... G06K 9/62

(52) U.S. Cl. ........................ 370/232; 370/235; 370/252; 382/156; 706/21

(58) Field of Search .................................... 370/230, 232, 370/395, 252, 235, 535; 700/17; 709/227, 230, 200; 706/15, 21; 714/2, 1, 15; 382/156; 713/168

(56) References Cited

U.S. PATENT DOCUMENTS

| | | | |
|---|---|---|---|
| 5,812,526 | * 9/1998 | Chang et al. .................... | 370/230 |
| 6,078,946 | * 6/2000 | Johnson ............................ | 709/200 |
| 6,178,505 | * 1/2001 | Schneider et al. ............... | 713/168 |

OTHER PUBLICATIONS

Hiramatsu, "Training Techniques for Neural Network Application in ATM", IEEE, 58–67, Oct. 1995.*

Hiramatsu, "ATM call admission control using a neural network trained with a virtual output buffer method", IEEE, 3611–3616, Dec. 1996.*

G Dorffner "Neural Networks for Time Series Processing", IDG 1996.

S Chong, S. Li and J. Ghosh, "Predictive Dynamic Bandwidth Allocation for Efficient Transport of Real–Time VBR Video over ATM", IEEE Journal on Selected areas on communications vol. 13 No. 1 Jan. 1995.

Z Fan and P. Mars "ATM traffic prediction using FIR neural networks", School of Engineering, University of Durham, UK.

F. Takens "Detecting strange attractors in turbulence" Comm. Math. Phys. (1971) vol 20 pp. 167–192.

Ricardo Mane "On the dimension of the compact invariant sets of certain non–linear maps", prepring IMPA, Rio de Janeiro 1980.

(List continued on next page.)

Primary Examiner—Hassan Kizou
Assistant Examiner—John Pezzlo
(74) Attorney, Agent, or Firm—Lee, Mann, Smith, McWilliam, Sweeney, Ohlson

(57) ABSTRACT

A method and apparatus for managing at least part of a communications network and particularly for managing a customer network, for example, within an asynchronous transfer mode communications network. A predictor is used to predict parameters such as bandwidth levels and to predict when the parameter(s) will exceed capacity or previously agreed thresholds. These agreed levels may be specified for example in a service level agreement between a service provider and a customer. The predictor also predicts, how much excess there will be and how long this will occur for. This information is provided to the service provider/customer and also can be provided to an agent which comprises a computer system. This agent negotiates on behalf of either the customer (for example) with another agent acting on behalf of the service provider (for example) and in this way new terms for an agreement between the two parties is obtained.

13 Claims, 2 Drawing Sheets

OTHER PUBLICATIONS

Ricard Rohwer "The time dimersion of neural network models" SIGART Bulletin, vol. 5, No. 3.

J–C Chappelier and A. Grumbach "Time in Neural Networks" SIGART Bulletin, vol. 5, No. 3.

Zaiyong Tang, Chrys de Almeida and Paul A Fishwick "Time series forecasting using neural networks vs. Box–Jenkins methodology" Nov. 1991 Simulation pp. 313–310.

Eric A Wan "Time Series Prediction by using a connectionist network with internal delay lines" In Time Series Prediction. Forecasting the future and understanding the past, Eds A Weigend and N.Gershenfeld, SFI Studies in the Sciences of Complexity, Proc. Vol. XVII, Addison–Wesley, 1994.

* cited by examiner

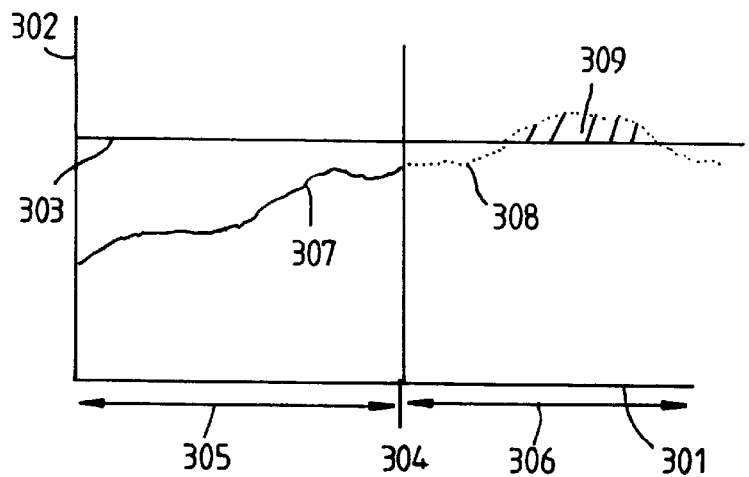

Fig. 3

```
interface SSETrendsAnalysisEngine
{
void createTrendsAnalyser(
  in SSETATASpecification ta_spec_id)
  raises (SSEExceptionRaised);

oneway void trainTrendsAnalyser(
  in SSEDTDataSet training_data_set_id);

void addInputPresentation(
  in SSETASinglePresentation new_data)
  raises (SSEExceptionRaised);

void makePrediction(
  in short number_of_recursions)
  raises (SSEExceptionRaised);

void switchPredator ()
  raises (SSEExceptionRaised);

void deleteTrandsAnalyser()
  raises (SSEExceptionRaised);
}
```

Fig. 4

METHOD AND APPARATUS FOR MANAGING AT LEAST PART OF A COMMUNICATIONS NETWORK

BACKGROUND OF THE INVENTION

1. Field of the Invention

This invention relates to a method and apparatus for managing at least part of a communications network and particularly for managing a customer network.

2. Description of the Prior art

Customers who make extensive use of a service provider's network are often provided with a "virtual private network". This enables them to control part of the service provider's network under an agreement such as a "service level agreement". The service level agreement typically specifies the bandwidth levels that the customer is allowed to use and other factors such as quality factors. If this bandwidth level is exceeded at any time by the customer, data can effectively be "discarded". However, it is very difficult for the customer to predict bandwidth requirements in advance in order to negotiate for a larger bandwidth when this is required. Also, if the service provider allows the agreed bandwidth level to be exceeded by allocating additional resources then penalty payments may be invoked.

If the agreed bandwidth level is exceeded by the customer there is also a problem for the service provider. The service provider has to decide whether to allocate extra resources to the customer and determine whether this is possible and how it can be achieved. Once the decision is made it needs to be implemented. This involves analysis of the communications network to see what bandwidth is available. These decisions are complex because they depend on many factors, such as costs, effects on other customer's allocated resources, and the possibility of charging the customer more for the extra bandwidth to be allocated.

Because different customers have different priorities and requirements it is difficult to develop a generic method of managing a customer network. Also, the customer himself requires to use the method of managing his network and so the method must be simple and easy to use.

It is accordingly an object of the present invention to provide a method and apparatus for managing at least part of a communications network and particularly for managing a customer network which overcomes or at least mitigates one or more of the problems noted above.

SUMMARY OF INVENTION

According to a first aspect of the present invention there is provided a method of managing at least part of a communications network comprising the steps of:
  (i) predicting a plurality of sequential future values of a time series of data relating to the communications network; and
  (ii) comparing each future value with at least one threshold value to produce a result.

A corresponding computer system for managing a communications network comprises:
  (i) a predictor arranged to predict a plurality of sequential future values of a time series of data relating to the communications network; and
  ii) a comparator arranged to compare each future value with at least one threshold value to produce a result.

A corresponding communications network comprises:
  (i) a computer system for managing at least part of the communications network; said computer system comprising:
    (ii) a predictor arranged to predict a plurality of sequential future values of a time series of data relating to the communications network; and
    (iii) a comparator arranged to compare each future value with at least one threshold value to produce a result.

This provides the advantage that future values of for example, data, video or voice traffic levels in a customer's virtual private network, can be predicted and it can be determined whether these exceed the bandwidth levels agreed (for example, in the service level agreement). The customer is then able to take action in advance of the agreed levels being exceeded. For example, this could involve preventing over use of the communications network or asking the service provider for more resources. Also the service provider has an advantage in that he knows in advance that the agreed levels may be exceeded and he can analyse the network in advance to see if extra bandwidth can be allocated. The service provider could then make an offer to sell extra bandwidth to the customer. Equally, if the agreed bandwidth levels will be under-utilised by the customer then both parties can make use of this information in a similar way.

Preferably, said communications network comprises at least two agents, each agent comprising a computer system provided with at least one communication link to another agent, said computer system being arranged to accept the results of the comparison and further comprising information about the threshold value, a set of criteria and a set of actions. It is also preferred that the method further comprises the steps of:
  (i) using the agents to determine a second threshold value on the basis of the result of the comparison, the first threshold value and each agent's set of criteria and set of actions; and
  (ii) replacing the first threshold value by the second threshold value. This provides the advantage that the results of the prediction can be used by the agents to renegotiate resources, for example via the service level agreement, on behalf of the customer and the service provider. This simplifies the customer's network management task and enables him to make efficient and cost effective use of his virtual private network. The customer obtains predicted values for his bandwidth levels, for example, and this information is used automatically by his agent on his behalf to renegotiate the service level agreement. Also, the service provider's network management task is simplified and he is able to make efficient and cost effective use of his communications network resources. The same method can be used by different types of customer who have different requirements and priorities by adjusting the set of actions and criteria in the customer's agent. Similarly, the service provider's agent can be modified.

BRIEF DESCRIPTION OF THE DRAWINGS

FIG. 3 is a graph of bandwidth against time showing actual performance, predicted performance and a predicted envelope of excess.

FIG. 4 shows an example trends analyser CORBA server IDL.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Figure 1:
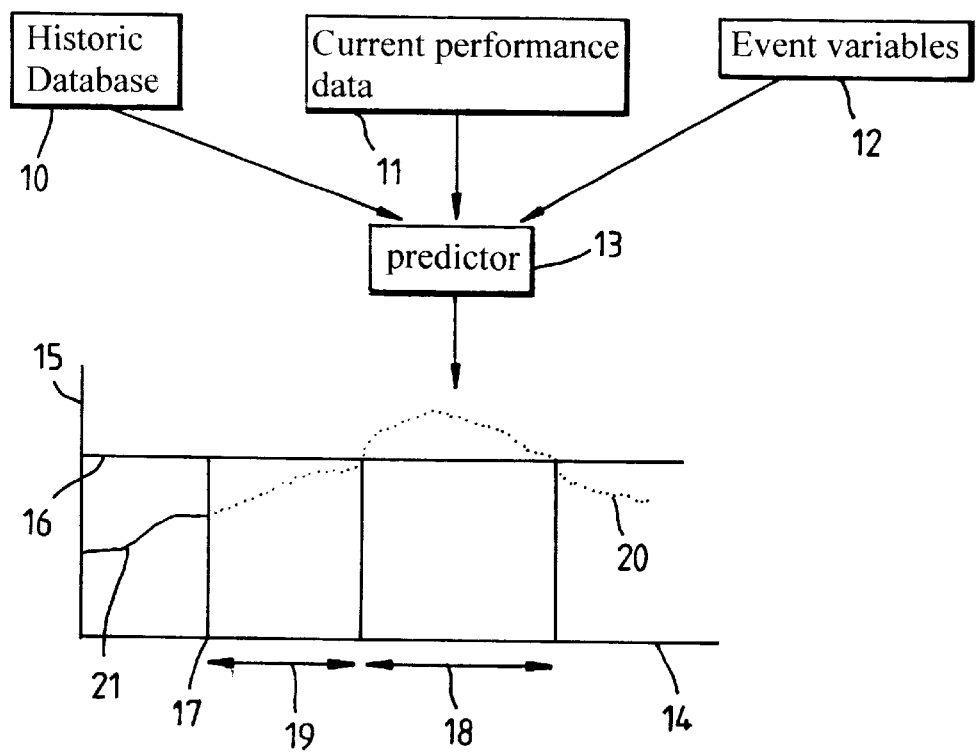
FIG. 1 is a schematic diagram of a sequence of events which takes place in a method of managing a customer network.

FIG. 1 shows schematically, a sequence of events which takes place in a method of managing a customer network. Information 10, 11, 12 is input to a predictor 13. The predictor can be a neural network for example, or any other type of predictor such as a statistical system or a linear predictor. The information input to the predictor comprises historic values of a time series 10, for example, traffic levels in a communications network, at a number of times in the past. Current values of the time series may also be provided 11 as well as event variables 12 although it is not essential to input this information 11, 12. Examples of event variables include the current time of day, the current day of the week and the current month.

Predicted values of the time series, for example, predicted traffic levels are output from the predictor and are represented by the dotted line labelled 20 in FIG. 1. Traffic levels are only one example of an operations measurement that can be predicted and used for network management. Other examples include hand-off call attempts, busy hour call attempts and dropped calls (or cells). Historic values of the time series 21 are also shown in FIG. 1. The traffic levels are shown in the form of a graph of traffic level, or bandwidth used 15 against time 14. The current time is labelled 17. The line 16 represents a threshold value which may be for example, the maximum amount of bandwidth that a customer is allowed to use on his virtual private network, as specified in the service level agreement between the customer and the network provider or operator. During the period of time labelled 18 the predicted traffic levels exceed the threshold value. The customer has a warning period 19 which is a period of time before which the traffic levels are predicted to exceed the threshold. Information about the amount of excess is also available.

Information about when the excess will occur, the amount of excess and the period of time during which the excess will occur are provided by the using the results of the predictor. This information can be made available to the customer and also to the network operator/service provider who are then able to take action based on this information.

It is also possible to predict other information and use this for customer network management. For example, factors to do with quality of service, such as parameters measured from a switch in the network including jitter and delay. Grade of service can also be predicted. The system can also be used to predict when agreed cost levels are will be exceeded or when utilisation of other types of network resources will exceed capacity or agreed levels.

As previously explained some customers who make extensive use of a service provider's network are often provided with a "virtual private network". This enables them to control part of the service provider's network for example, under a service level agreement. The service level agreement typically specifies the bandwidth levels (as well as other factors) that the customer is allowed to use. If this bandwidth level (or other factor) is exceeded (or breached) at any time by the customer data can effectively be "discarded" or other penalties may be incurred such as penalty payments. The term "virtual private network" is used to refer to a communications network that is used and controlled by a customer or other entity and which is part of a larger communications network that is controlled by a service provider or other entity. A virtual private network is an example of a customer network. The term "customer network management" refers to interaction between an operator and a customer in relation to managing some aspects of the operator's network. The term, "at least part of a communications network" is used to refer, for example, to a virtual private network.

Figure 2:
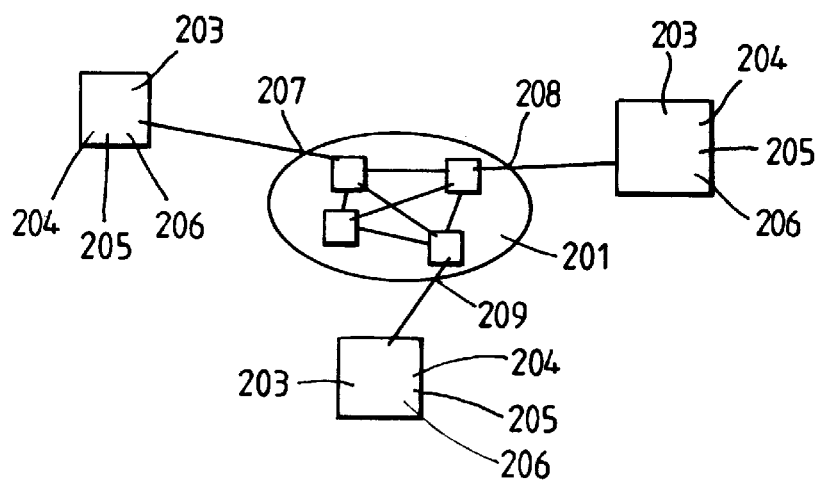
FIG. 2 is a schematic diagram of a communications network where a customer is running voice, data and video services between three sites over a virtual network provided by a network operator.

FIG. 2 shows an example of a network operator (or service provider) providing an asynchronous transfer mode (ATM) virtual private network (VPN) service to its customer. The customer is running voice 204, data 205, and video 206 service between three sites 203 over a virtual network (represented by the whole figure) which is running on the operator's ATM network 201. The amount of traffic entering the operator's network from the customer's VPN connection is monitored and predicted using the method described above.

The operator can monitor the amount of network traffic entering the network from each of the customer sites at points 207, 208 and 209. The ability to predict future demand from each connection gives both the operator and the customer a number of advantages:

- The operator is able to predict short term future demand on the network. This can allow the operator, or automatic process (such as an agent), to pro-actively reconfigure resources to cope with any increase in traffic before services are affected.
- The operator is able to detect when customers are likely to exceed agreed levels of service. By informing and negotiating with the customer over the expected demand there are a number of possible outcomes, e.g.:
- The operator may agree to carry the excess traffic at a premium rate.
- The customer may decide to cut back on inter-site traffic by blocking or rescheduling tasks.
- The operator may block the excess traffic protecting the network from the increased load and preventing the customer from incurring penalty charges.

FIG. 3 shows how the predictor can be used to determine an envelope of excess.

FIG. 4 shows a graph of bandwidth 302 against time 301. The line 303 represents a threshold value for the bandwidth that is specified for example in the service level agreement. The solid line 307 represents actual or recorded traffic or bandwidth levels and the dotted line 308 represents predicted traffic or bandwidth levels. Time period 305 represents past time, point 304 represents the current time and period 306 represents future time. An envelope of excess 309 occurs. This is the region bounded by the predicted traffic level curve and the threshold value. By specifying the envelope of excess 309 the following information is specified:

- A prediction of the time when demand will exceed capacity.
- A prediction of the extent of the predicted excess.
- A prediction of the time when demand will return below capacity.

In one example, the predictor 13 is a neural network based trends analyser as described in U.S. Pat. No. 6,125,105 in the name of Northern Telecom Limited. The text of U.S. Pat. No. 6,125,105 including the whole specification, appendices, drawings and examples are hereby imported by reference in their entirety. It is intended that the information included therein forms an integral part of the present application.

An example of how such a trends analyser is used to form one aspect of a customer network management system is now described.

The trends analyser is trained using historic logs of network traffic, allowing its neural network to learn expected network traffic behaviour patterns. Once trained the trends analyser is able to predict future traffic demand based on the current monitored traffic, which may be presented to the user graphically.

The management system is split into four components:

A common object request broker architecture (CORBA) server, providing the distribution mechanism for the core trends analysis functionality The administration client, allowing the set-up and management of the server The prediction client, for monitoring and requesting predictions of the network traffic The prediction grapher, for displaying the monitored and predicted network traffic in a graph.

The trends analyser CORBA Server is an encapsulation of the trends analysis engine to provide the trends analyser functionality through a defined CORBA interface description language (IDL) interface (see FIG. 3).

By encapsulating the trends analysis engine in a CORBA interface a number of advantages are gained:

Distribution. The trends analyser server can be run on a separate machine from the client application (for example, the customer's computer system).

Language Independence. Client applications may be implemented in a variety of languages, including C, C++, Smalltalk and Java, independent of the server implementation.

The administration client uses the defined CORBA IDL interface to the trends analyser server to create, train, retrain, switch and delete instances of the trends analysis engine.

The purpose of the prediction client is to monitor the network traffic on a network connection and present this information to the trends analyser using, for example, the defined CORBA IDL interface and to receive predicted future levels of network traffic.

AddInputPresentation(). Presents the current level of network traffic to the trends analyser. This information is used by the trends analysis engine to make predictions of the future traffic patterns.

MakePrediction(). Asks the trends analyser to predict the network traffic for the next given number of time periods.

The current and predicted network traffic for the connection is logged to file. This file can then be displayed in the form of a graph to the operator, customer, or alternatively the prediction client could pass the predicted demand to an automated management process (e.g. an agent).

The prediction grapher can be used to display the performance log generated by the prediction client. The graph displays the actual monitored network traffic alongside the previous and future traffic predictions.

The components are then integrated into HP OpenView Network Node Manager.

The prediction client is an HP OpenView compliant daemon process controlled by the ovspmd background process supervisor. Performance data for a connection on a device is collected via SNMP. Using the monitored performance, predictions are obtained from the trends analyser server and stored to file.

The administration client has a Tcl/Tk interface which may be launched from the OpenView Windows menu bar, allowing the operator to retrain the trends analyser when its accuracy degrades.

The trends analyser CORBA server remains separate from HP OpenView and may be run on a separate machine from the HP OpenView server.

The information from the predictor, for example, a predicted excess envelope, is made available to an agent. The term "agent" is used to refer to a computer system which is provided with at least one communication link to another agent, said computer system being arranged to accept the results of the comparison and further comprising information about the threshold value, a set of criteria and a set of actions. The agent acts on behalf of the customer for example and negotiates a new service level agreement when this is necessary (for example, when an excess envelope is predicted).

The agent negotiates with at least one other agent, which acts on behalf of the service provider or network operator.

An agent has a negotiation model which represents at various levels of abstraction the entire negotiation process-from why agents need to negotiate to the types of actions they should perform during the negotiation. The negotiation model comprises a set of criteria and a set of actions.

Examples of criteria include, "service timings are more important to resolve than service costs", "agree on service details before proceeding with service agreement details", "accept all requests that can be performed", "only accept requests that bring material gain", "refuse unless agreement reached before 5 counter-proposals made". An agent may choose between criteria depending on the context of the negotiation and even within the same negotiation.

Examples of actions include: CAN-DO, PROPOSE, COUNTER-PROPOSE, ACCEPT, REJECT.

An example of a negotiation model involves three main components:

1. A data structure that represents the result of negotiation.
2. A negotiation protocol.
3. A reasoning model.

The data structure for representing agreements is referred to as a Service Level Agreement (SLA). Agents negotiate with one another over services. Each service has an associated set of attributes that vary from high-level meta details such as price, quality and start time to lower level details such as the inputs needed or the outputs required. Agents exchange these SLA proposals throughout negotiation until either both parties accept a particular SLA or one or both reject it. The final SLA captures and represents agreements between agents over these attributes which define the conditions for providing a service, such as a virtual private network.

The agents communicate using a negotiation protocol. For example, this may be a limited set of speech act types such as CAN-DO, PROPOSE, COUNTER-PROPOSE, ACCEPT, REJECT.

An agent reasons about an offer and either accepts, rejects or generates a counter-offer is represented by a negotiation model. The model is implemented using two component knowledge bases (KBs): a declarative KB and a procedural KB. The declarative KB, represented as a causal network, explicitly describes a model of what is being negotiated for and for what purpose. For example, to negotiate over the price of a service is a meta-service conflict that can be caused either by an agent being charged too much for a service or by the fact that the agent can infer that the other agent is wealthy. The procedural KB, represented as a set of strategies or criteria, specifies the set of actions to be taken given this declarative knowledge. For example, given the knowledge that the agent needs to negotiate over the price, an agent may adopt a strategy that involves generating a price offer and continuing to counter-propose that initial offer. Another example of a strategy is a tit for tat strategy where the negotiation behaviour of a fellow agent is copied.

There are a number of advantages of using intelligent agents including:

System designers are able to abstract problem solutions in higher-level terms, to focus on the complex issues of interactions in simpler terms and hence produce more sophisticated, appropriate and maintainable solutions.

Emergent behaviour is facilitated, where interactions, associations and organisational structure develop with more efficient solutions emerging as a result.

Greater distribution of the network management function is enabled.

Integration of heterogeneous and legacy (network management) systems is enabled.

Intelligent agent managed communications systems are more responsive and can cope with scalability and performance problems.

Intelligent agent managed communications systems are flexible and dynamic and can facilitate "on demand" network services.

Intelligent agent managed communications systems are able to cope with increasing complexities of network management function and preferences (both of operators and customers).

Use of intelligent agents is especially useful in telecommunications systems where:

There is no centralised control, or centralised control is unreliable and unstructured.

Systems have been constructed through disparate design principles, and are heterogeneous in nature.

Standard interfaces are not used in practice and are unlikely to be used.

Interfaces need to be flexible or where complex negotiation or adaptation of the interface is necessary.

Development of large and complex legacy systems already exist and what is required is to encapsulate such systems in a more open fashion.

The complexity of the interface requirements precludes a simple client-server architecture (for example where more complex adaptation is required).

What is claimed is:

1. A method of predicting the performance of a virtual private network forming part of a communications network, comprising the steps of:
   (i) recording a predetermined maximum permissible traffic level value for the virtual private network,
   (ii) predicting a plurality of sequential future values of a time series of data representative of predicted traffic levels in the virtual private network;
   (iii) comparing the predicted future values with the predetermined maximum traffic level value, and
   (iv) providing an output representative of a parameter selected from the group of; a time at which traffic levels as represented by at least one of the future values will be greater than the predetermined maximum traffic level, a duration between a pair of future values which represent the start and finish of a period of traffic levels which are greater than the predetermined maximum traffic level, and the amount by which the traffic levels represented by the future values is greater than the predetermined maximum traffic level.

2. A method as claimed in claim 1 wherein said step (ii), of predicting, further comprises the steps of:
   (i) inputting a plurality of values of the time series into a neural network, the values being representative of present and historic traffic levels in the virtual private network, and
   (ii) obtaining outputs from the neural network said outputs comprising predicted future values of the time series.

3. A method as claimed in claim 1 wherein said step (ii), of predicting, further comprises the steps of:
   (i) inputting a plurality of values of the time series into a neural network, the values being representative of present and historic traffic levels in the virtual private network, and
   (ii) obtaining outputs from the neural network said outputs comprising the predicted future value(s) of the time series.

4. A method as claimed in claim 3 wherein said step (i), of inputting, further comprises the step of inputting information about a time into the neural network.

5. A method as claimed in claim 4 wherein the information about said time is input to the neural network in the form of at least one pair of values which relate to an angle.

6. A method as claimed in claim 5 wherein said pair of values comprise the sine and cosine of said angle.

7. A method as claimed in claim 1 wherein the information about said time comprises information about a current time.

8. A method as claimed in claim 1 wherein the values of said time series of data are univariate.

9. A method as claimed in claim 1 wherein said communications network includes a VPN agent and a provider agent, each agent comprising a computer system provided with at least one communication link to another agent, the VPN agent being operable to perform negotiations on behalf of the virtual private network, and the provider agent being operable to perform negotiations on behalf of the communications network, the method further including the steps of providing the VPN agent with information about a set of criteria and a set of actions and the VPN agent negotiating a revised predetermined maximum permissible traffic level value with the provider agent based on the said output, the set of criteria and the set of actions.

10. A computer system for predicting the performance of a virtual private network comprising:
    (i) a predictor arranged to predict a plurality of sequential future values of a time series of data representative of predicted traffic levels in the virtual private network; and
    (ii) a comparator arranged to compare each future value with a predetermined maximum traffic level value for the virtual private network, and
    (iii) prediction output apparatus arranged to output a value representative of a parameter selected from the group of; a time at which traffic levels as represented by at least one of the future values will be greater than the predetermined maximum traffic level, a duration between a pair of future values which represent the start and finish of a period of traffic levels which are greater than the predetermined maximum traffic level, and the amount by which the traffic levels represented by the future values is greater than the predetermined maximum traffic level.

11. A computer system as claimed in claim 10 further comprising a VPN agent and a provider agent, each agent being a software process and having an associated respective set of criteria and set of actions and being arranged to perform negotiations respectively on behalf of the virtual private network, and on behalf of the communications network.

12. A computer system as claimed in claim 10, further comprising a prediction analyser arranged to receive the comparator output and to provide an output representative of a parameter selected from the group of; a time at which traffic levels as represented by at least one of the future values will be greater than the predetermined maximum traffic level, a duration between a pair of future values which represent the start and finish of a period of traffic levels which are greater than the predetermined maximum traffic level, and the amount by which the traffic levels represented by the future values is greater than the predetermined maximum traffic level.

13. A communications network including:
   (i) a computer system for managing at least part of the communications network; said computer system comprising:
   (ii) a predictor arranged to predict a plurality of sequential future values of a time series of data representative of traffic levels in the network; and
   (iii) a comparator arranged to compare each future value with a predetermined maximum traffic level value for the network, and
   (iv) prediction output apparatus arranged to output a value representative of a parameter selected from the group of; a time at which traffic levels as represented by at least one of the future values will be greater than the predetermined maximum traffic level, a duration between a pair of future values which represent the start and finish of a period of traffic levels which are greater than the predetermined maximum traffic level, and the amount by which the traffic levels represented by the future values is greater than the predetermined maximum traffic level.

\* \* \* \* \*